US011677850B2

(12) United States Patent
Zhao

(10) Patent No.: US 11,677,850 B2
(45) Date of Patent: Jun. 13, 2023

(54) METHOD, APPARATUS AND SYSTEM FOR NOTIFICATION

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Benjing (CN)

( * ) Notice: Subject to any disclaimer, the term of this patent is extended or adjusted under 35 U.S.C. 154(b) by 20 days.

(21) Appl. No.: 16/319,976

(22) PCT Filed: Jul. 28, 2017

(86) PCT No.: PCT/CN2017/094795
§ 371 (c)(1),
(2) Date: Jan. 23, 2019

(87) PCT Pub. No.: WO2018/019281
PCT Pub. Date: Feb. 1, 2018

(65) Prior Publication Data
US 2019/0273790 A1 Sep. 5, 2019

(30) Foreign Application Priority Data

Jul. 29, 2016 (CN) .......................... 201610617868.5
Aug. 12, 2016 (CN) .......................... 201610665731.7

(51) Int. Cl.
H04L 67/55 (2022.01)
H04L 51/214 (2022.01)
(Continued)

(52) U.S. Cl.
CPC ............ *H04L 67/55* (2022.05); *H04L 51/214* (2022.05); *H04L 51/224* (2022.05); *H04L 67/53* (2022.05); *H04L 67/567* (2022.05); *H04L 67/60* (2022.05)

(58) Field of Classification Search
CPC ......... H04L 67/26; H04L 51/14; H04L 51/24; H04L 67/20; H04L 67/2838
See application file for complete search history.

(56) References Cited

U.S. PATENT DOCUMENTS 6,807,423 B1 * 10/2004 Armstrong .......... H04L 12/1813
370/328
8,856,807 B1 * 10/2014 Khapre .................. G06Q 10/10
719/318
(Continued)

FOREIGN PATENT DOCUMENTS

CN 1794709 A 6/2006
CN 101056197 A 10/2007
(Continued)

OTHER PUBLICATIONS

International Search Report dated Nov. 1, 2017.
(Continued)

*Primary Examiner* — Oleg Survillo
*Assistant Examiner* — Monishwar Mohan
(74) *Attorney, Agent, or Firm* — Dilworth & Barrese, LLP; Michael J. Musella, Esq.

(57) ABSTRACT

A method, an apparatus and a system for notification. The method includes; determining an event notification criterion; and determining whether participant information satisfies the event notification criterion, and if yes, sending a notification to a notified party: where the participant information includes at least one of a participant identifier, a participant identifier feature, a participant role or a participant role feature.

12 Claims, 7 Drawing Sheets

(51) Int. Cl.
   *H04L 51/224* (2022.01)
   *H04L 67/53* (2022.01)
   *H04L 67/60* (2022.01)
   *H04L 67/567* (2022.01)

(56) References Cited

U.S. PATENT DOCUMENTS

| | | | | |
|---|---|---|---|---|
| 10,403,126 | B1* | 9/2019 | Morehead | G08B 27/001 |
| 2004/0122734 | A1* | 6/2004 | Schleicher | G06Q 30/0235 |
| | | | | 705/14.27 |
| 2005/0102389 | A1* | 5/2005 | Liscano | H04M 3/4228 |
| | | | | 709/224 |
| 2005/0232401 | A1* | 10/2005 | Ordille | H04L 67/22 |
| | | | | 379/88.22 |
| 2006/0235981 | A1* | 10/2006 | Westman | H04W 4/06 |
| | | | | 709/227 |
| 2007/0047715 | A1* | 3/2007 | Madhusudan | H04M 3/56 |
| | | | | 379/202.01 |
| 2008/0010301 | A1* | 1/2008 | Tian | H04L 67/54 |
| 2008/0184266 | A1* | 7/2008 | Bornhoevd | G06F 9/542 |
| | | | | 719/318 |
| 2012/0066694 | A1* | 3/2012 | Jennings | G06F 9/542 |
| | | | | 719/318 |
| 2012/0127262 | A1* | 5/2012 | Wu | H04N 7/152 |
| | | | | 348/14.09 |
| 2012/0324589 | A1* | 12/2012 | Nukala | H04L 63/10 |
| | | | | 726/28 |
| 2013/0066979 | A1* | 3/2013 | Vasters | G06Q 10/10 |
| | | | | 709/206 |
| 2013/0290457 | A1* | 10/2013 | Wang | H04L 51/00 |
| | | | | 709/206 |
| 2014/0117078 | A1* | 5/2014 | Duquenoy-bernaudin | |
| | | | | G06Q 10/107 |
| | | | | 235/375 |
| 2015/0288924 | A1* | 10/2015 | Liu | H04N 7/15 |
| | | | | 348/14.08 |
| 2016/0088420 | A1* | 3/2016 | Kim | H04W 28/16 |
| | | | | 370/328 |
| 2016/0219125 | A1* | 7/2016 | Xiao | H04W 4/70 |
| 2016/0350722 | A1* | 12/2016 | Walker | G16H 40/20 |
| 2017/0238279 | A1* | 8/2017 | Jeong | H04W 68/00 |
| | | | | 455/458 |
| 2017/0257741 | A1* | 9/2017 | Kim | H04W 4/70 |
| 2018/0013800 | A1* | 1/2018 | Morrison | H04L 65/403 |
| 2019/0278760 | A1* | 9/2019 | Smart | G06F 16/2237 |

FOREIGN PATENT DOCUMENTS

| | | |
|---|---|---|
| CN | 102546970 A | 7/2012 |
| CN | 102594718 A | 7/2012 |
| CN | 105580327 A | 5/2016 |
| EP | 2999185 A1 | 3/2016 |
| EP | 3043530 A1 | 7/2016 |
| JP | 2008070981 A | 3/2008 |
| WO | 2016068548 A1 | 5/2016 |

OTHER PUBLICATIONS

International Preliminary Report on Patentability dated Jan. 29, 2019.
Second Chinese Office Action dated Feb. 21, 2020.
Extended European Search Report issued by the European Patent Office for European Patent Application No. 17833584.0 dated Dec. 19, 2019.
First Japanese Office Action from Japanese Patent Application No. 2019-504900 dated Jun. 7, 2021.
First Japanese Office Action from Chinese Patent Application No. 20195044900 dated Jun. 7, 2021.

* cited by examiner

METHOD, APPARATUS AND SYSTEM FOR NOTIFICATION

TECHNICAL FIELD

Embodiments of the present disclosure relate to a method, an apparatus and a system for notification.

BACKGROUND

With development of a technology of Internet of Things, application fields of various Internet of Things have been rapidly developed, and many proprietary protocols have emerged. Because respective proprietary protocols are not completely compatible, development of the technology of Internet of Things may be hindered.

A communication protocol for Internet of Things defines a notification subscription mechanism. A subscriber sends a subscription request to a subscribed party, and sends a notification to a notified party when an event occurs.

SUMMARY

Embodiments of the disclosure provide a method, an apparatus and a system for notification.

The method for notification, comprises:

determining an event notification criterion; and determining whether participant information satisfies the event notification criterion, and if yes, sending a notification to a notified party; wherein the participant information includes at least one of a participant identifier, a participant identifier feature, a participant role or a participant role feature.

For example, determining the event notification criterion includes: determining the event notification criterion from a subscription resource or from an event notification criterion set.

For example, determining the event notification criterion includes:

determining the event notification criterion from a subscription resource; or determining the event notification criterion from an event notification criterion set.

For example, the method further comprises:

creating a subscription resource, the subscription resource including the event notification criterion.

For example, prior to creating the subscription resource, the method further comprises: receiving a subscription resource creation request sent by a subscriber.

For example, determining whether participant information satisfies the event notification criterion includes:

determining whether the participant information matches a specified value, and if yes, determining that the participant information satisfies the event notification criterion.

For example, the method further comprises: receiving a subscription request sent by a subscriber to determine the event notification criterion.

For example, the method further comprises: receiving an operation request, wherein the operation request includes the participant information.

For example, the method further comprises: receiving a registration request, wherein the registration request includes the participant information.

For example, determining whether participant information satisfies the event notification criterion includes: determining whether the participant information is different from a determination feature, and if yes, determining that the participant information satisfies the event notification criterion.

For example, determining whether participant information satisfies the event notification criterion includes: determining whether the participant information is identical to the determination feature, and if yes, determining that the participant information satisfies the event notification criterion.

For example, determining whether participant information satisfies the event notification criterion includes: counting a number of participants having participant information different from a determination feature; determining whether the number of participants satisfies the event notification criterion; and if the number of participants satisfies the event notification criterion, determining that the participant information satisfies the event notification criterion.

For example, determining whether the number of participants satisfies the event notification criterion includes: determining whether the number of participants is greater than or equal to a first threshold, and if yes, determining that the number of participants satisfies the event notification criterion; or, determining whether the number of participants is less than or equal to a second threshold, and if yes, determining that the number of participants satisfies the event notification criterion; or, determining whether the number of participants is greater than or equal to the first threshold and less than or equal to the second threshold, and if yes, determining that the number of participants satisfies the event notification criterion.

For example, determining whether the participant information satisfies the event notification criterion includes: counting a number of participants having the participant information identical to a determination feature; determining whether the number of participants satisfies the event notification criterion; if yes, determining that the participant information satisfies the event notification criterion.

For example, determining whether the number of participants satisfies the event notification criterion includes: determining whether the number of participants is greater than or equal to a third threshold, and if yes, determining that the number of participants satisfies the event notification criterion; or, determining whether the number of participants is less than or equal to a fourth threshold, and if yes, determining that the number of participants satisfies the event notification criterion; or, determining whether the number of participants is greater than or equal to the third threshold and less than or equal to the fourth threshold, and if yes, determining that the number of participants satisfies the event notification criterion.

For example, the determination feature includes at least one of an identifier, a role, an identifier feature and a role feature.

For example, the identifier includes at least one of a subscriber identifier, a subscribed party identifier, a notified party identifier, a participant identifier, a subscriber preset identifier, a subscribed-party preset identifier, a notified-party preset identifier, and a participant preset identifier; the role includes at least one of a subscriber role, a subscribed party role, a notified party role, a participant role, a subscriber preset role, a subscribed-party preset role, a notified-party preset role, and a participant preset role; the identifier feature includes at least one of a subscriber identifier feature, a subscribed-party identifier feature, a notified-party identifier feature, a participant identifier feature, a subscriber preset identifier feature, a subscribed-party preset identifier feature, a notified-party preset identifier feature and a participant preset identifier feature; and the role feature includes at least one of a subscriber role feature, a subscribed-party role feature, a notified-party role feature, a participant role feature, a subscriber preset role feature, a subscribed-party preset role feature, a notified-party preset role feature and a participant preset role feature.

Embodiments of the disclosure provide an apparatus for notification, comprising: a determining unit, configured to determine an event notification criterion; a notifying unit, configured to determine whether participant information satisfies the event notification criterion, and if yes, send a notification to a notified party; wherein the participant information includes at least one of a participant identifier, a participant identifier feature, and a participant role, and a participant-role identifier feature.

For example, the determining unit is configured to: determine the event notification criterion from a subscription resource or from an event notification criterion set.

For example, the apparatus further comprises: a subscription resource creating unit, configured to create the subscription resource, wherein the subscription resource includes the event notification criterion.

For example, the apparatus further comprises: a first receiving unit, configured to receive a subscription resource creation request sent by a subscriber.

For example, the notifying unit is configured to determine whether the participant information matches a specified value, and if yes, determine that the participant information satisfies the event notification criterion, and send a notification to the notified party.

For example, the apparatus further comprises: a second receiving unit, configured to receive a subscription request sent by a subscriber to determine the event notification criterion.

For example, the first receiving unit is further configured to receive an operation request, wherein the operation request including the participant information; or the first receiving unit is further configured to receive a registration request, wherein the registration request includes the participant information.

For example, the notifying unit is configured to: determine whether the participant information is different from a determination feature, and if yes, determine that the participant information satisfies the event notification criterion, and send a notification to the notified party.

For example, the notifying unit is configured to: determine whether the participant information is identical to the determination feature, and if yes, determine that the participant information satisfies the event notification criterion, and send a notification to the notified party.

For example, the notifying unit is configured to: count a number of participants having participant information different from a determination feature; determine whether the number of participants satisfies the event notification criterion; and if the number of participants satisfies the event notification criterion, determine that the participant information satisfies the event notification criterion, and send a notification to the notified party.

For example, the notifying unit is configured to: count a number of participants having the participant information identical to the determination feature; determine whether the number of participants satisfies the event notification criterion; and if the number of participants satisfies the event notification criterion, determine that the participant information satisfies the event notification criterion, and send a notification to the notified party.

For example, the determination feature includes at least one of an identifier, a role, an identifier feature and a role feature.

For example, the identifier includes at least one of a subscriber identifier, a subscribed party identifier, a notified party identifier, a participant identifier, a subscriber preset identifier, a subscribed-party preset identifier, a notified-party preset identifier, and a participant preset identifier; the role includes at least one of a subscriber role, a subscribed party role, a notified party role, a participant role, a subscriber preset role, a subscribed-party preset role, a notified-party preset role, and a participant preset role; the identifier feature includes at least one of a subscriber identifier feature, a subscribed-party identifier feature, a notified-party identifier feature, a participant identifier feature, a subscriber preset identifier feature, a subscribed-party preset identifier feature, a notified-party preset identifier feature and a participant preset identifier feature; and the role feature includes at least one of a subscriber role feature, a subscribed-party role feature, a notified-party role feature, a participant role feature, a subscriber preset role feature, a subscribed-party preset role feature, a notified-party preset role feature and a participant preset role feature.

Embodiments of the disclosure provide a system for notification, comprising:

the apparatus described above, the apparatus being a subscription servicing apparatus;

a subscribing apparatus, configured to send a subscription creation request to the subscription servicing apparatus;

a participant apparatus, configured to send an operation request to the subscription servicing apparatus; and a notified-party apparatus, configured to receive a notification from the subscription servicing apparatus.

Embodiments of the present disclosure provide a method, an apparatus and a system for notification, so as to implement subscribing notifications based on a specific participant. Specifically, when detecting that the specific participant satisfies an event notification criterion, a subscription servicing party sends a notification message to a notified party, where the specific participant is: a participant whose participant information includes at least one of a participant identifier and a participant role. In this way, a notification service based on the specific participant is implemented, which meets differentiated needs of users.

BRIEF DESCRIPTION OF THE DRAWINGS

In order to illustrate the technical solutions in the embodiments of the present disclosure or the existing arts more clearly, the drawings needed to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

REFERENCE SIGNS

Figure 1:
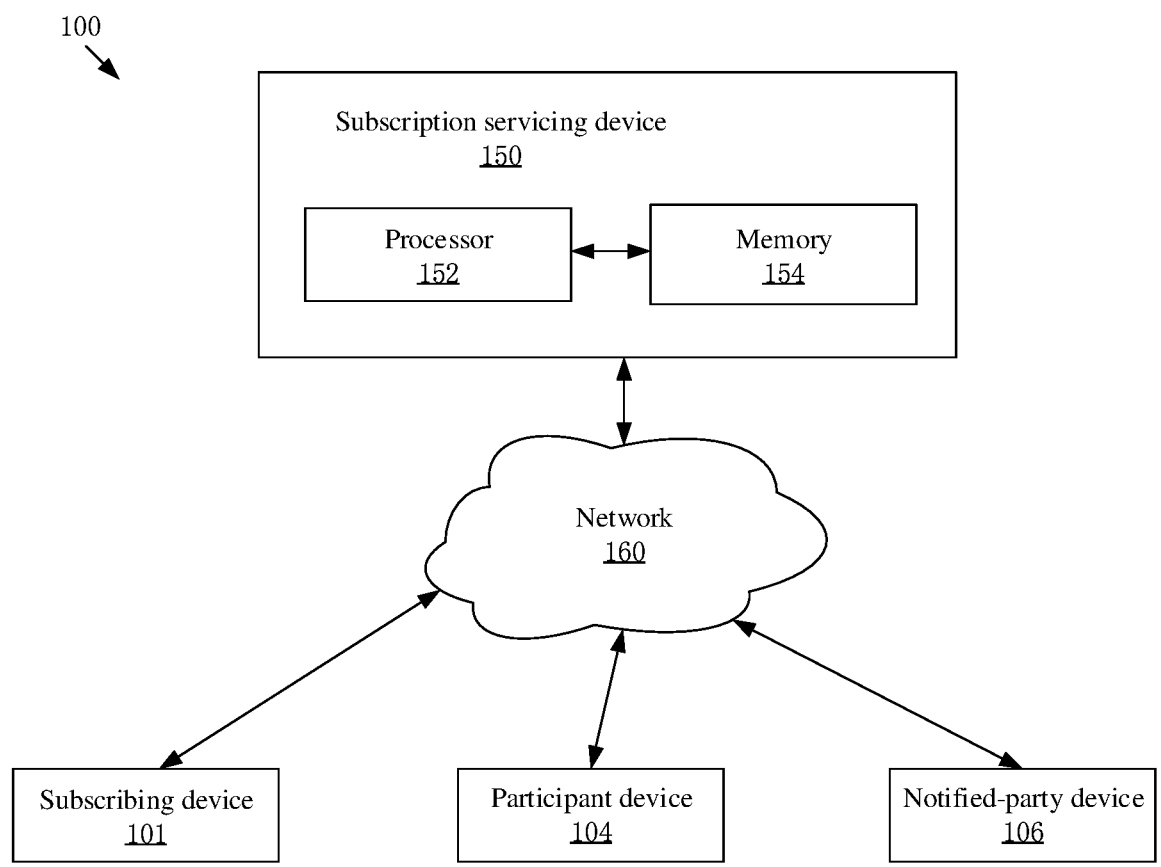
FIG. 1 is a schematic block diagram of hardware of a system used for subscribing notifications provided by at least one embodiment of the present disclosure.

Subscribing device 101; participant device 104; notified-party device 106; subscription servicing device 150; processor 152; memory 154; network 160; subscription servicing apparatus 300; subscription resource creating unit 330; event notifying unit 320; first receiving unit 340; second receiving unit 350; participant apparatus 402; subscribing apparatus 404; and notified-party apparatus 406.

DETAILED DESCRIPTION

Hereafter, in order to illustrate the purposes, technical solutions and advantages of the present disclosure to be more clearly, the embodiments of the present disclosure will be described in a clearly and fully understandable way. It is obvious that the described embodiments are just a part but not all of the embodiments of the present disclosure. Based on embodiments of the present disclosure, all other embodiments obtained by those skilled in the art without making other inventive work should be within the scope of the present disclosure.

In current related technologies, a subscriber sends a subscription request to a subscription servicing party (also referred to as a subscribed party, or a notifying party), and the subscription request may indicate that: when an event occurs, the subscription servicing party sends a message to a notified party. The subscriber and the notified party may be a same entity or different entities. Criteria for event occurrence are defined under a subscription resource (for example, a <subscription> resource is created under subscribed resources and the event notification criteria are included in parameters of "eventNotificationCriteria" of the <subscription> resource). When an event notification criterion is satisfied, the subscription servicing party sends a notification to the notified party. For example, parameters of the event notification criteria include, but are not limited to, parameters listed in Table 1:

TABLE 1

| Conditions | Description |
| --- | --- |
| createdBefore< > | Resource creation time earlier than <a value> |
| createdAfter< > | Resource creation time later than <a value> |
| modifiedSince< > | Modified after <a time stamp> |
| unmodifiedSince< > | Unmodified after <a time stamp> |
| stateTagSmaller< > | A tag stateTag (the number of modifications) smaller than <a value> |
| stateTagBigger< > | A tag stateTag (the number of modifications) bigger than <a value> |
| expireBefore< > | Expiration time smaller than <a value> |
| expireAfter< > | Expiration time larger than <a value> |
| sizeAbove< > | Content of <contentInstance> larger than <a value> |
| sizeBelow< > | Content of <contentInstance> smaller than <a value> |

TABLE 1-continued

| Conditions | Description |
| --- | --- |
| eventType | Time type |
| operationMonitor | Specific operations, including create, retrieve, update, delete, etc. |
| attribute | Attributes of resources |
| missingData | An amount of data lost within a period of time |
| filterOperation | Criteria logic relationship |

Different circumstances of participating entities (for example, the subscriber, the participant, the notified party, and so on) are not taken into account in current subscription mechanisms. In a practical application, when the notified party wants to execute a corresponding action based on a specific participant (for example, when a certain participant executes a certain operation), the subscription servicing party may send a message to the notified party. Existing notification subscription mechanisms cannot meet requirements in these aspects. The specific participant may be understood as: another participant except the subscriber, the subscribed party, and the notified party; the other participant may execute operations such as updating, deleting, creating, and the like. Of course, the participant and the subscriber, the subscribed party or the notified party may be a same entity or different entities.

Embodiments of the present disclosure provide a method, an apparatus and a system for notification, which implement notification, for example, subscription service, based on a specific participant. Specifically, when the subscription servicing party detects the specific participant, it sends a notification message to the notified party to implement notification service based on the participant. Therefore, differentiated needs of users are satisfied.

Specifically, the embodiments of the present disclosure provide a method, an apparatus and a system for notification, which implement notification based on the specific participant. Specifically, when the subscription servicing party detects that the specific participant satisfies a party of an event notification criterion, it sends a notification message to the notified party. For example, when detecting that information of a specific participant satisfies an event notification criterion, the subscription servicing party sends a notification message to the notified party.

For example, the event notification criteria are event notification conditions (eventNotificationCriteria conditions). The event notification criteria may include an event notification criterion set, and the event notification criterion set may include one or more subconditions. When it is determined that the participant information satisfies an event notification criterion, it may be determined that the participant information satisfies any one of the subconditions, or satisfies all subconditions.

For example, the participant information includes at least one of a participant identifier, a participant role, a participant role feature, or a participant identifier feature.

In this way, the notification service based on the specific participant is implemented, which satisfies differentiated requirements of users.

Hereinafter, subscription is taken as an application scenario to illustrate the method, the apparatus and the system for notification in a subscription process.

FIG. 1 is a schematic block diagram of hardware of a system 100 used for notification provided by an embodiment of the present disclosure. As shown in FIG. 1, the system 100 may include a subscribing device 101, a participant device 104, a notified-party device 106 and a subscription servicing device 150 (the subscription servicing device may be a notifying device for notification). Respective devices in the system 100 may be connected through a network 160. Respective devices of the system 100 may communicate with each other directly or indirectly. For example, respective devices of the system 100 may send and receive data and/or signals to each other over the network 160.

The network 160 may be a network capable of implementing interconnection and interworking of ordinary objects having independent functions. The network 160 may be a wireless network, and of course, the network 160 may also include a wired network. For example, the network 160 may be Internet of Things based on the Internet and/or telecommunications networks. Each user can use electronic tags for connecting ordinary objects with the Internet of Things, and so specific physical locations of respective ordinary objects may be found on the Internet of Things. Centralized management and control may be performed on respective machines and devices with a central computer through the Internet of Things. For example, remote control, search of their locations, and so on, may be performed on household facilities (for example, smart refrigerators, smart microwave ovens, etc.), machines or devices such as automobiles.

The subscription servicing device 150 (i.e., the notifying device) may be a computing device that includes a processor and a memory. For example, the subscription servicing device 150 may be a server. Of course, the subscription servicing device 150 may also be a desktop computer, a laptop computer, a smartphone, a tablet computer, or any other device including a processor and a memory. FIG. 1 shows that the subscription servicing device 150 includes a processor 152 and a memory 154.

The processor 152 may process data signals, and may include various computing structures, for example, a complex instruction set computer (CISC) structure, a reduced-structure instruction set computer (RISC) structure, or a structure that implements a combination of various instruction sets. In some embodiments, the processor 152 may also be a microprocessor, for example, an X86 processor or an ARM processor, or may be a digital signal processor (DSP), and the like. The processor 152 may control other components in the subscription servicing device 150 to execute desired functions.

The memory 154 may save instructions and/or data executed by the processor 152. For example, the memory 154 may include one or more computer program products, and the computer program products may include various forms of computer-readable storage media, for example, volatile memory and/or non-volatile memory. The volatile memory may include, for example, a random access memory (RAM) and/or a cache, and the like. The non-volatile memory may include, for example, a read only memory (ROM), a hard disk, a flash memory, and the like. One or more computer program instructions may be stored on the computer-readable storage medium, and the processor 152 may execute the program instructions, to implement the notification subscription function and/or other desired functions as described below. In the computer-readable storage medium, various application programs and various data, for example, various data and the like used and/or generated by the application program may also be stored.

The subscribing device 101 may be a computing device that includes a processor and a memory. For example, the subscribing device 101 may be a television, a desktop computer, a laptop computer, a smartphone, a tablet computer, a game controller, a music player (for example, an mp3 player), or any other terminal including a processor and memory (for example, a mobile terminal, an intelligent terminal). In some embodiments, the subscribing device 101 may include a processor, a memory, and other components such as input devices and output devices.

The participant device 104 may be a computing device that includes a processor and a memory. For example, the participant device 104 may be a television, a smart household appliance, an electric car, a desktop computer, a laptop computer, a smartphone, a tablet computer, or any other terminal (for example, a mobile terminal and an intelligent terminal) including a processor and a memory. In some embodiments, the participant device 104 may include a processor, a memory, and other components such as input devices and output devices.

The notified-party device 106 may be a computing device that includes a processor and a memory. For example, the notified-party device 106 may be a television, a smart household appliance, an electric car, a desktop computer, a laptop computer, a smartphone, a tablet computer, a game controller, a music player (for example, an mp3 player) and any other terminal (for example, a mobile terminal and an intelligent terminal) including a processor and a memory. In some embodiments, the notified-party device 106 may include a processor, a memory, and other components such as input devices and output devices.

In some embodiments, the subscriber and the notified party may be a same entity, and may also be different entities. The participant and the subscriber may be a same entity, and may also be different entities; if they are the same entity, then this entity is an entity that has both roles of the subscriber and the participant at a same time, and may perform a subscribing operation and a third-party operation at a same time. Of course, the subscriber, the notified party and the participant may also be entities that are different from each other.

In some embodiments, the subscriber operates on the subscribing device 101, and sends a subscription creation request to the subscription servicing device 150. In scenarios without ambiguity, a subscriber as described in the embodiments of the present disclosure may refer to the subscribing device 101, a subscriber that operates the subscribing device 101, or a subscribing apparatus 404 installed in the subscribing device 101 as described below.

An operator may operate on the participant device 104, and send an operation request to the subscription servicing device 150. Of course, the participant device 104 may also automatically send an operation request to the subscription servicing device 150 in a scenario with no human intervention. In scenarios without ambiguity, a participant as described in the embodiments of the present disclosure may refer to the participant device 104, an operator that operates the participant device 104, or a participant apparatus 402 installed in the participant device 104 as described below.

A notified person may operate on the notified device 106. For example, the notified person can read notifications from the subscription servicing device 150 through the notified device 106. In scenarios without ambiguity, a notified party as described in the embodiments of the present disclosure may refer to the notified device 106, a notified person that operates the notified device 106, or a notified-party apparatus 406 installed in the notified device 106 as described below.

A service provider may operate on the subscription servicing device 150 and send a notification to the notified party. Of course, the subscription servicing device 150 may also automatically send a notification to the notified party when an event notification criterion is satisfied in a scenario with no human intervention. In scenarios without ambiguity, a subscription servicing party as described in the embodiments of the present disclosure may refer to the subscription servicing device 150, a service provider that operates the subscription servicing device 150, or a subscription servicing apparatus 300 installed in the subscription servicing device 150 as described below (the subscription servicing apparatus may be a notifying apparatus for notification).

In some embodiments, respective devices of the system 100 may further include a display apparatus (for example, an LCD, an OLED or a projection apparatus), an input apparatus (for example, a touch apparatus, a keyboard, a microphone, a mouse, and the like), a loudspeaker or a vibrating apparatus, and the like, according to needs.

Figure 8:
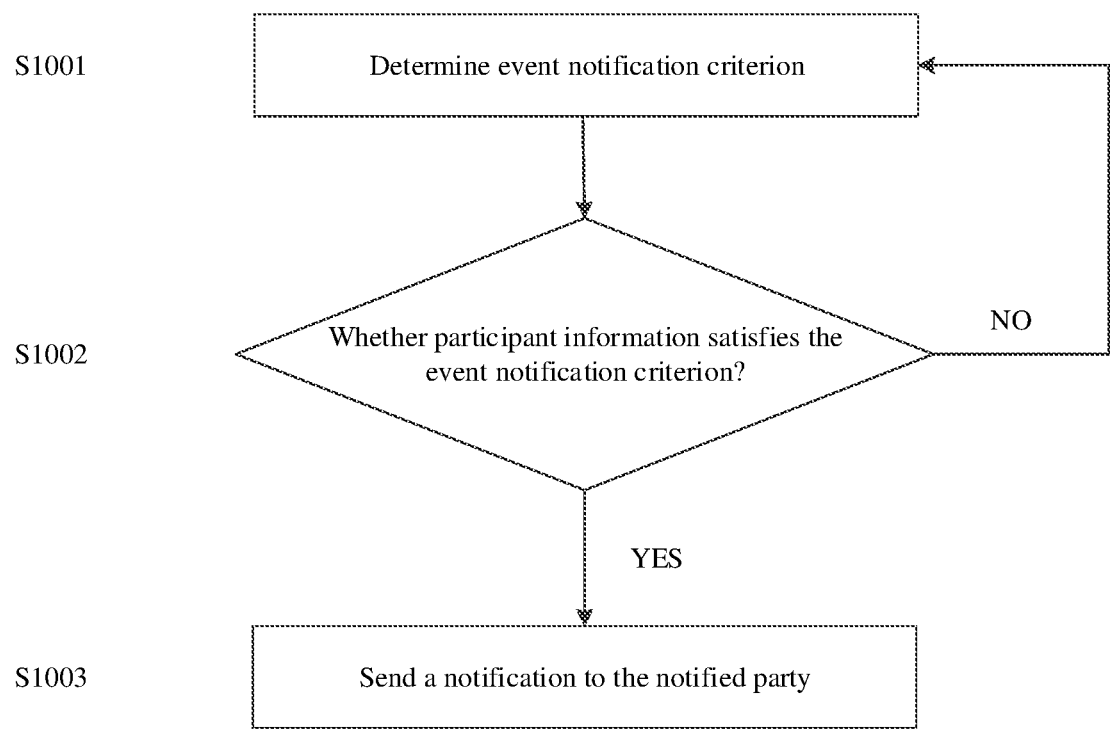
FIG. 8 is a flow chart of a method for notification provided by at least one embodiment of the present disclosure.

An embodiment of the present disclosure provides a method for notification in a subscription scenario; and as shown in FIG. 8, the method comprises:

Step S1001, including: determining an event notification criterion; step S1002, including: determining whether participant information satisfies the event notification criterion, and if yes, sending a notification to the notified party, wherein the participant information includes at least one of a participant identifier, a participant identifier feature, a participant role, or a participant role identifier; and step S1003, including: sending the notification to the notified party, if the participant information satisfies the event notification criterion.

The method provided in the above-described embodiment of the present disclosure may determine whether to notify based on a matching relationship between participant information (especially at least one piece of participant information such as the participant identifier, the participant identifier feature, the participant role, and the participant role identifier, etc.) and the event notification criterion, which meets notification needs of more users or participants.

For example, the determining event notification criterion may include: determining the event notification criterion from a subscription resource or from an event notification criterion set.

For example, in some embodiments, criteria for event occurrence are defined under the subscription resource, i.e., the subscription resource includes event notification criteria (i.e., event notification conditions, eventNotificationCriteria), and a subscription resource may correspond to event notification criteria under that resource. When an event notification criteria is being determined, the event notification criterion may be determined from the subscription resource, and for example, the event notification criterion in the subscription resource is directly selected as the event notification criterion that needs to be determined.

For another example, in some other embodiments, the event notification criteria are not included in the subscription resource, but are independently configured in an event notification criterion set other than the subscription resource; and the event notification criterion set may include one or more event notification criteria. When determining event notification criteria, one or more event notification criteria may be determined from the event notification criterion set as event notification criteria that need to be determined.

Determining an event notification criterion from the subscription resource, includes: retrieving the event notification criterion from the subscription resource that includes the event notification criterion, or directly matching an event notification criterion in the subscription resource without retrieving. Of course, one or more event notification criteria may be retrieved directly from the event notification criterion set, or one or more event notification criteria in the event notification criterion set may be directly matched, so as to determine whether an event notification criterion is satisfied when the participant information is retrieved.

In some implementations, the subscription resource may be a subscription resource created in response to a subscription resource creation request, after the subscription resource creation request sent by the subscriber is received. For example, when a request for creating a <subscription> resource is initiated by an application entity (AE) or a common service entity (CSE), a corresponding subscribed party creates a subscription resource including event notification criteria according to the request for creating the <subscription> resource. Alternatively, when the subscription resource request sent by the subscriber is received, a corresponding subscription resource that matches the subscription resource request may also be determined for the subscription resource request from already-created subscription resources.

For example, the operation of determining the event notification criterion may be performed after receiving a subscription request sent by the subscriber. For example, when the participant and the subscriber each are a universal plug and play (UPNP) control point (CP), the subscribed party is a UPNP client, and the notified party is a UPNP device, the subscriber sends the subscription request to the subscribed party. The subscription request carries a universal resource locator (URL), a service identifier of the subscribed party and a URL of the notified party. After the subscribed party receives the subscription request, it matches the subscription resource for the subscriber, and the subscription resource may be determined according to a pre-configured event notification criterion. Then, the participant sends an action request to the subscribed party; when the subscribed party receives the action request, participant information (for example, a participant ID) is carried in the action request; after receiving the action request, the subscribed party determines whether the participant information satisfies the pre-configured notification criterion (for example, determining whether the participant ID satisfies the notification criterion). If the participant information satisfies the pre-configured notification criterion, it sends a notification to the notified party.

It should be noted that, in some embodiments of the present disclosure, the participant may be understood as another participant other than the subscriber, the subscribed party and the notified party.

In some Internet of Things communication protocols (for example, a machine to machine (M2M) protocol), an originator and a receiver are defined from a dimension of information exchange. A party initiating a request is referred to as the originator, the originator may be an application entity (AE) or a common service entity (CSE); and a party receiving the request is referred to as the receiver, and the receiver may be a CSE.

For example, if the originator initiates a <subscription> resource creation request, then the originator becomes a resource subscriber, briefly referred to as a subscriber, and a corresponding receiving party is a subscribed party. However, in some Internet of Things communication protocols, because there is no definition for the subscribed party, a Hosting CSE is used for representing the subscribed party. For another example, if the originator initiates a registration request, the originator becomes a registering party, and a corresponding receiving party is a registered party.

For another example, if the originator initiates an operation request, the originator becomes an operation requesting party (briefly referred to as a requesting party), and the receiving party becomes an operation request receiving party. The registering party, the subscriber, and the operation requesting party may be different roles of a same entity when executing different actions, or may be different entities executing different actions. In some embodiments, the participant, the subscriber, the subscribed party and the notified party may be different roles of a same entity when executing different actions, or may also be different entities executing different actions; if the participant sends the registration request, it is the registering party; and if the participant sends the operation request, it becomes the operation requesting party.

Optionally, the operation of determining whether the participant information satisfies the event notification criterion specifically includes: determining whether the participant information matches a specified value, and if yes, determining that the participant information satisfies the event notification criterion.

For example, the specified value is a specific value, and the specific value may be configured in the subscription resource, or may also be configured outside the subscription resource. The specific value is provided to the subscription resource when determining whether the participant information satisfies the event notification criterion. The specific value may be a value that represents a data type, a value that represents a data structure, a value that represents data content, and the like; for example, the specific value may be a content feature of the identifier (for example, 1111-22). For example, determining whether the participant information matches a specified value includes: determining whether the participant information is equal to the specified value, greater than the specified value, or less than the specified value, or determining whether the number of participant information is greater than the number of specified values, equal to the number of specified values, or less than the number of specified values. A matching mode for matching the participant information and the specified value is configured according to different application scenarios. For example, when it is desired to notify the notified party when the number of participants exceeds a specific value, the matching mode may be configured as: determining the number of identifiers of the participants, and when the number of identifiers is greater than the specific value, notifying the notified party.

It should be noted that, the identifier may be a specific value, which may be a specific numerical value, a symbol, or a combination thereof. For example, an identifier of entity A is 1111-22, an identifier of entity B is 2222-11, and if compared, the identifiers of the two are different.

An identifier feature is a feature of an identifier, which may include a structural feature of the identifier and/or a content feature of the identifier. For example, the identifier of the entity A is AAAA-AA, the identifier of the entity B is AAAA-BB, structures of both of the identifiers are in a form of XXXX-YY, and then the structural features of the two are the same. The identifier AAAA-AA includes a character A, the identifier AAAA-BB includes two characters A and B, and so, it can be seen that the identifier content features of the two identifiers are different.

Similarly, with respect to a role and a role feature, the role refers to a role itself, and the role feature refers to a feature owned by the role. Similar description will not be repeated here.

In view of the subscription application scenario, before determining the event notification criterion, the above-described method further comprises: receiving a subscription request sent by the subscriber. In this way, the event notification criterion may be determined based on the subscription request. After the subscription request is received, a subscription resource corresponding to the subscription request may be determined. For example, a pre-stored subscription resource may be retrieved locally or one subscription resource may be created; and generally, the event notification criterion is included in the determined subscription resource. Then the event notification criterion may be retrieved from the subscription resource, when the event notification criterion is being determined.

Hereinafter, a specific process of the method for notification according to the embodiments of the present disclosure will be illustrated, by taking a case where the subscription resource is created after the subscription request is received as an example.

Figure 2:
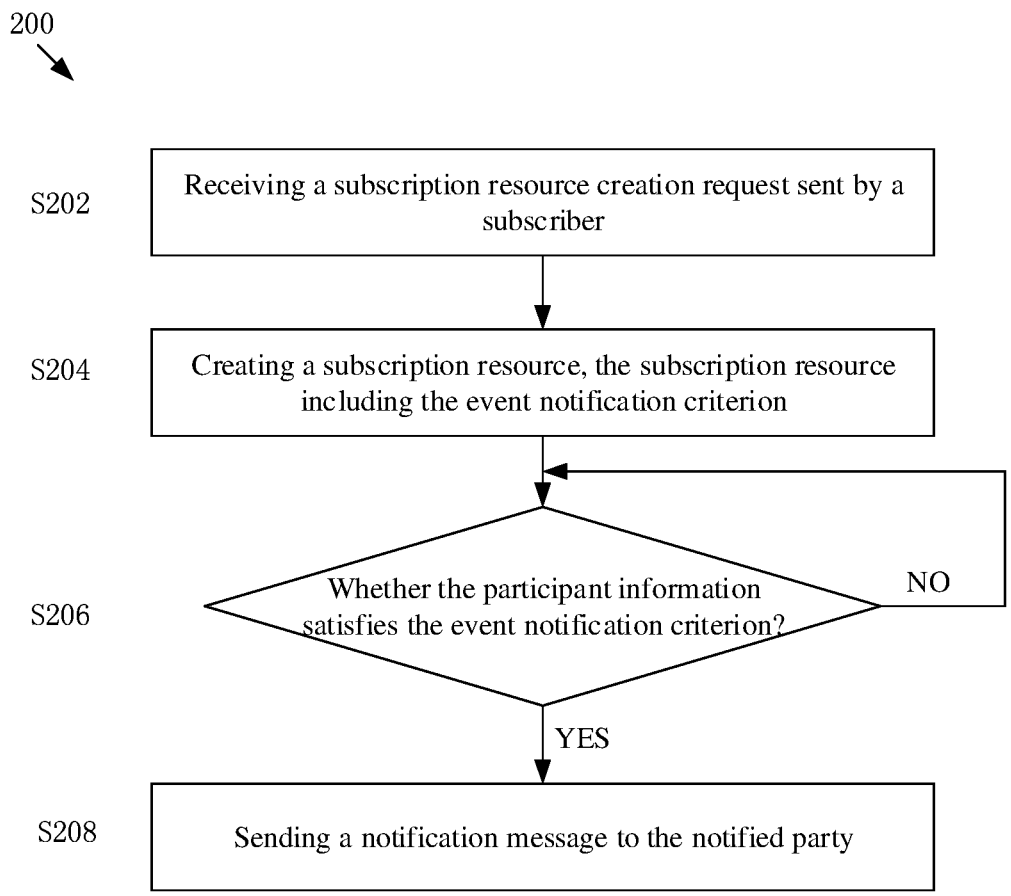
FIG. 2 is a flow chart of a method for notification provided by at least one embodiment of the present disclosure.

FIG. 2 is a schematic flow chart of a method 200 for notification provided by one of the above-described embodiments of the present disclosure. In some embodiments, the method 200 may comprise some or all of the steps as shown in FIG. 2 (for example, some or all of steps 202, 204, 206 and 208). Of course, the method 200 may also comprise other steps not shown in FIG. 2.

Step S202 includes: receiving a subscription creation request (i.e., a subscription resource creation request or a request to create a <subscription> resource) from the subscriber.

Step S204 includes: creating a subscription resource, where the subscription resource includes an event notification criterion.

Step S206 includes: determining whether participant information satisfies the event notification criterion, where the participant information includes at least one of a participant identifier (ID), a participant role, a participant identifier feature, and a participant role feature.

Step S208 includes: if the participant information satisfies the event notification criterion, sending a notification to the notified party; otherwise, ending the flow.

The method 200 further comprises:

after the subscribed party creates the subscription resource, the subscribed party receiving an operation request, the operation request including the participant information; or, the subscribed party receiving a registration request, and the registration request including the participant information. Specifically, the operation request is an operation request from the participant (that is, an operation requesting party); and the registration request is a registration request from the registering party. Considering that in an actual scenario it is need to monitor operation status of other devices except the registering party, the registered party and the notified party, the subscribed party may be configured to determine whether the event notification criterion is satisfied according to the participant information (for example, the ID of the operation requesting party, and at this point, the participant is the operation requesting party) carried in the operation request, when receiving the operation request from the participant.

Considering that in an actual scenario it is needed to know whether there is a new device to register, then the subscribed party may be configured to determine whether the event notification criterion is satisfied according to the participant information (for example, the ID of the registering party, and at this point, the participant is the registering party) carried in the registration request, when receiving the registration request from the registering party.

Under some Internet of Things protocols (for example, the M2M protocol), the registering party and the subscriber may be different roles of a same entity when executing different actions.

For example, after a specific entity A (the registering party) initiates a registration request to another entity B (the registered party) and is registered successfully, the entity A may send a subscription resource creation request to the entity B; and at this point, the entity A is the subscriber, and the entity B is the subscribed party, and the entity B creates the subscription resource for the entity A, that is, the subscription is successfully.

For example, after the entity A sends the registration request and the subscription resource creation request to the entity B and registers and subscribes successfully, there is an entity D registering to the entity B. It may be determined whether an ID of the entity D is equal to an ID of a registered device, that is, whether the ID of the entity D is equal to the ID of the entity A (at this point, the ID of the entity A is the specified value); and if not, the notified party is notified that there is a new device registered.

For another example, after the entity A sends the registration request and the subscription resource creation request to the entity B and registers and subscribes successfully, an entity C initiates a registration request to the entity B and registers successfully. After that, the entity C initiates an operation request to the entity B, and at that point, it may determined whether an ID carried in the operation request of the entity C is greater than 10 (here, the numerical value 10 is the specified value); and if yes, the notified party is notified that there are 10 devices requesting to execute operation actions.

Further, after the operation request is received, the subscribed party sends a response of the operation request to the participant, or sends a response of the registration request to the registering party.

For example, the operation request may be a creating request, a retrieving request, an updating request, a deleting request or other types of requests. The operation request may include the information of the participant (briefly referred to as the participant information). For example, the participant information includes at least one of the participant identifier (ID), the participant role, the participant identifier feature, and the participant role feature.

In some embodiments, all participants may be classified according to roles or role features. By taking the participant information is a participant role as an example, all the participants may be classified into administrators, ordinary users, VIP users and other users. The participant role indicates that the participant is an administrator, an ordinary user, a VIP user or another user. The role feature of the participant is the user's identity.

In some embodiments, a respective participant identifier may be one of an application entity identifier (AE-ID), a common service entity identifier (CSE-ID), a resource identifier (resource ID), and the like. The participant identifier records that the participant is the application entity identifier, the common service entity identifier or the resource identifier, and a specific number of the identifier. For example, the participant identifier is 1234ABC.

In some embodiments, the participant information may be a participant identifier feature; for example, if the participant identifier is 1234ABC, the identifier feature thereof is four consecutive digits plus three consecutive letters.

In some embodiments, in step S204, creating the subscription resource includes: creating the subscription resource in response to the subscription resource creation request; and setting an event notification criterion of the subscription resource. For example, a determination feature of the event notification criterion may be set (here, the determination feature is the specified value). The determination feature may include at least one of an identifier, a role, an identifier feature and a role feature. The identifier may include at least one of a subscriber identifier, a subscribed party identifier, a notified party identifier, a participant identifier, a subscriber preset identifier, a subscribed-party preset identifier, a notified-party preset identifier, and a participant preset identifier. The role may include at least one of a subscriber role, a subscribed party role, a notified party role, a participant role, a subscriber preset role, a subscribed-party preset role, a notified-party preset role, and a participant preset role. The identifier feature may include at least one of a subscriber identifier feature, a subscribed-party identifier feature, a notified-party identifier feature, a participant identifier feature, a subscriber preset identifier feature, a subscribed-party preset identifier feature, a notified-party preset identifier feature and a participant preset identifier feature. The role feature may include at least one of a subscriber role feature, a subscribed-party role feature, a notified-party role feature, a participant role feature, a subscriber preset role feature, a subscribed-party preset role feature, a notified-party preset role feature and a participant preset role feature.

For example, the determination feature may be set as the subscriber identifier, the preset identifier, or the notified party identifier. For another example, the determination feature may be set as the subscriber role, the preset role, or the notified party role. For another example, the determination feature may include: the subscriber identifier and the subscriber role; or, the subscriber preset identifier or the subscriber preset role; or, the notified party identifier and the notified party role. Of course, the determination feature may also be set as other specified values, which will not be limited here in the present disclosure.

In step S206, in some embodiments, determining whether the participant information satisfies the event notification criterion includes: determining whether the participant information is different from the determination feature; and if the participant information is different from the determination feature, determining that the participant information satisfies the event notification criterion.

For example, the determination feature may be the subscriber identifier, and it may be determined whether the participant identifier is different from the subscriber identifier; if the participant identifier is different from the subscriber identifier (for example, the participant ID the subscriber ID), it is determined that the participant information satisfies the event notification criterion. The subscriber identifier may be retrieved from a subscription creation request from the subscriber.

For another example, the determination feature may be the subscriber role, and it may be determined whether the participant role is different from the subscriber role; if the participant role is different from the subscriber role (for example, the participant role the subscriber role), it is determined that the participant information satisfies the event notification criterion. The subscriber role may be retrieved from the subscription creation request from the subscriber.

In step S206, in some other embodiments, determining whether the participant information satisfies the event notification criterion includes: determining whether the participant information is the same as the determination feature; and if the participant information is the same as the determination feature, determining that the participant information satisfies the event notification criterion.

For example, the determination feature may be the preset identifier, and it is determined whether the participant identifier is the same as the preset identifier; if the participant identifier is the same as the preset identifier (for example, the participant ID=the preset ID), it is determined that the participant information satisfies the event notification criterion.

For another example, the determination feature may be the preset role, and it is determined whether the participant role is the same as the preset role; and if the participant role is the same as the preset role (for example, the participant role=the preset role), it is determined that the participant information satisfies the event notification criterion.

In step S206, determining whether the participant information satisfies the event notification criterion may further include: counting the number of participants having participant information different from the determination feature; and determining whether the number of participants satisfies the event notification criterion; and if the number of participants satisfies the event notification criterion, determining that the participant information satisfies the event notification criterion.

In some embodiments, determining whether the number of participants satisfies the event notification criterion includes: determining whether the number of participants is greater than or equal to a first threshold; if the number of participants is greater than or equal to the first threshold, determining that the number of participants satisfies the event notification criterion.

For example, the participants may be classified according to roles (administrators, ordinary users, VIP users, other users, etc.). It is assumed that the determination feature is set as a VIP user in the role (i.e., the determination feature is set to "VIP user"), the first threshold is set to 15. When the number of participants that have the "VIP user" role and send an operation request to the subscription servicing apparatus 300 is equal to or greater than 15 (i.e., the number of participants having the "VIP user" role≥the first threshold 15), the event notification criterion is satisfied, and the subscription servicing apparatus 300 may send a notification to the notified party.

In some other embodiments, determining whether the number of participants satisfies the event notification criterion includes: determining whether the number of participants is less than or equal to a second threshold; if the number of participants is less than or equal to the second threshold, determining that the number of participants satisfies the event notification criterion.

For example, it is assumed that the determination feature is set as to a VIP user in the role (i.e., the determination feature is set to "VIP user"), and the second threshold is set to 25. When the number of participants that have the "VIP user" role and send an operation request to the subscription servicing apparatus 300 is equal to or smaller than 25 (i.e., the number of participants having the "VIP user" role≤the second threshold 25), the event notification criterion is satisfied, and the subscription servicing apparatus 300 may send a notification to the notified party.

In still other embodiments, determining whether the number of participants satisfies the event notification criterion includes: determining whether the number of participants is greater than or equal to the first threshold and less than or equal to the second threshold; and if the number of participants is greater than or equal to the first threshold and less than or equal to the second threshold, determining that the number of participants satisfies the event notification criterion.

For example, it is assumed that the determination feature is set as to a VIP user in the role (i.e., the determination feature is set to "VIP user"), the first threshold is set to 15, and the second threshold is set to 25. When the number of participants that have the "VIP user" role and send an operation request to the subscription servicing apparatus 300 is equal to or greater than 15 and is equal to or less than 25 (i.e., the first threshold 15≤the number of participants having the "VIP user" role≤the second threshold 25), the event notification criterion is satisfied, and the subscription servicing apparatus 300 may send a notification to the notified party.

Alternatively, in step S206, determining whether the participant information satisfies the event notification criterion includes: counting the number of participants that have the participant information to be the same as the determination feature; and determining whether the number of participants satisfies the event notification criterion; if the number of participants satisfies the event notification criterion, determining that the participant information satisfies the event notification criterion. For example, determining whether the number of participants satisfies the event notification criterion includes: determining whether the number of participants is greater than or equal to a third threshold, and if yes, determining that the number of participants satisfies the event notification criterion; or, determining whether the number of participants is less than or equal to a fourth threshold, and if yes, determining that the number of participants satisfies the event notification criterion; or, determining whether the number of participants is greater than or equal to the third threshold and less than or equal to the fourth threshold, and if yes, determining that the number of participants satisfies the event notification criterion.

It should be noted that, the event notification criterion may include the first threshold, the second threshold, the third threshold, and/or the fourth threshold. The first threshold, the second threshold, the third threshold, and/or the fourth threshold may be set at a same time when setting the event notification criterion. Of course, specific numerical values of the first threshold, the second threshold, the third threshold and/or the fourth threshold may be set by the subscriber, the subscription servicing party or the notified party, which will not be limited here in the present disclosure.

An embodiment of the present disclosure further provides another method for notification, comprising:

receiving a subscription request from a subscriber, and retrieving an event notification criterion; and determining whether participant information satisfies the event notification criterion, and if yes, sending a notification to a notified party.

Further, the method further comprises: creating or directly retrieving a subscription resource after receiving the subscription request, the subscription resource including the event notification criterion.

Retrieving the event notification criterion includes: retrieving the event notification criterion included in the subscription resource.

For example, the participant includes a registering party; and the method further comprises: receiving a registration request from the registering party, the registration request including the participant information. Or, the participant includes a requesting party; the method further comprises: receiving an operation request from a third-party participant.

For example, the participant information includes at least one of a participant identifier, a participant identifier feature, a participant role, and a participant role identifier.

Figure 3:
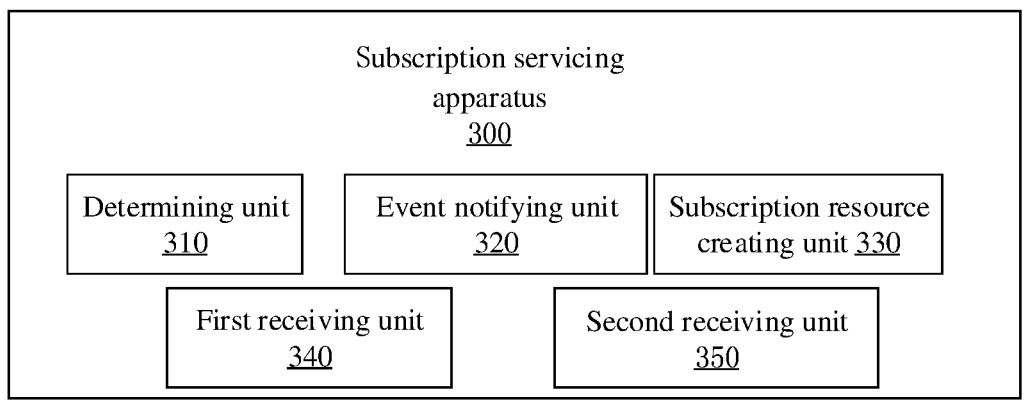
FIG. 3 is a schematic block diagram of an apparatus used for subscription service provided by at least one embodiment of the present disclosure.

FIG. 3 is a schematic block diagram of a subscription servicing apparatus 300 provided by an embodiment of the present disclosure. The subscription servicing apparatus 300 is configured for notifying a notified party, including a determining unit 310 and a notifying unit 320. The determining unit 310 is configured for determining an event notification criterion; and the notifying unit 320 is configured for determining whether participant information satisfies the event notification criterion, and if yes, sending a notification to the notified party; where the participant information includes at least one of a participant identifier, a participant identifier feature, and a participant role, and a participant-role identifier feature.

For example, the determining unit 310 may be specifically configured for: determining the event notification criterion from a subscription resource or from an event notification criterion set.

For example, the subscription servicing apparatus 300 further includes: a subscription resource creating unit 330, configured for creating the subscription resource, where the subscription resource includes the event notification criterion.

For example, the subscription servicing apparatus 300 further includes: a first receiving unit 340, configured for receiving a subscription resource creation request sent by a subscriber, before creating the subscription resource.

For example, the notifying unit 320 is specifically configured for determining whether the participant information matches a specified value, and if yes, determining that the participant information satisfies the event notification criterion and sending a notification to the notified party.

For example, the subscription servicing apparatus 300 further includes: a second receiving unit 350, configured for receiving a subscription request sent by the subscriber to determine the event notification criterion.

For example, the first receiving unit 340 is further configured for receiving an operation request, where the operation request includes the participant information.

For example, the notifying unit 320 may be specifically configured for determining whether the participant information is different from the determination feature, and if yes, determining that the participant information satisfies the event notification criterion and sending a notification to the notified party.

For example, the notifying unit 320 is specifically configured for determining whether the participant information is identical to the determination feature, and if yes, determining that the participant information satisfies the event notification criterion and sending a notification to the notified party.

For another example, the notifying unit 320 is specifically configured for: counting the number of participants having participant information different from the determination feature; and determining whether the number of participants satisfies the event notification criterion; and if the number of participants satisfies the event notification criterion, determining that the participant information satisfies the event notification criterion, and sending a notification to the notified party.

Alternatively, the notifying unit 320 is specifically configured for: counting the number of participants having the participant information the same as the determination feature; and determining whether the number of participants satisfies the event notification criterion; if yes, determining that the participant information satisfies the event notification criterion, and sending a notification to the notified party.

For example, the determination feature includes at least one of an identifier, a role, an identifier feature, and a role feature, etc. For example, the determination feature is a type of the specified value.

For example, the identifier includes at least one of a subscriber identifier, a subscribed party identifier, a notified party identifier, a participant identifier, a subscriber preset identifier, a subscribed-party preset identifier, a notified-party preset identifier, and a participant preset identifier; the role includes at least one of a subscriber role, a subscribed party role, a notified party role, a participant role, a subscriber preset role, a subscribed-party preset role, a notified-party preset role, and a participant preset role; the identifier feature includes at least one of a subscriber identifier feature, a subscribed-party identifier feature, a notified-party identifier feature, a participant identifier feature, a subscriber preset identifier feature, a subscribed-party preset identifier feature, a notified-party preset identifier feature and a participant preset identifier feature; and the role feature may include at least one of a subscriber role feature, a subscribed-party role feature, a notified-party role feature, a participant role feature, a subscriber preset role feature, a subscribed-party preset role feature, a notified-party preset role feature and a participant preset role feature.

Respective units of the subscription servicing apparatus 300 may be configured to execute functions or steps of the method 200 shown in FIG. 2, which will not be repeated here. For example, respective units of the subscription servicing apparatus 300 may be implemented by the processor 152 in the subscription servicing device 150 shown in FIG. 1 when executing program instructions stored in the memory 154, and the processor 152 may execute respective steps in the method 200, and other steps not shown in FIG. 2.

An embodiment of the present disclosure further provides a system for notification subscription, comprising: the subscription servicing apparatus 300 as described above; a subscribing apparatus, configured to send a subscription creation request to the subscription servicing apparatus and receive a response of the subscription creation request from the subscription servicing apparatus; a participant apparatus, configured to send an operation request to the subscription servicing apparatus, and receive a response of the operation request from the subscription servicing apparatus; and a notified-party apparatus, configured to receive a notification from the subscription servicing apparatus.

The subscription servicing apparatus 300 may be set in the subscription servicing device 150, the subscribing apparatus may be set in the subscribing device 101, the participant apparatus may be set in the participant device 104, and the notified-party apparatus may be set in the notified-party device 106.

Figure 4:
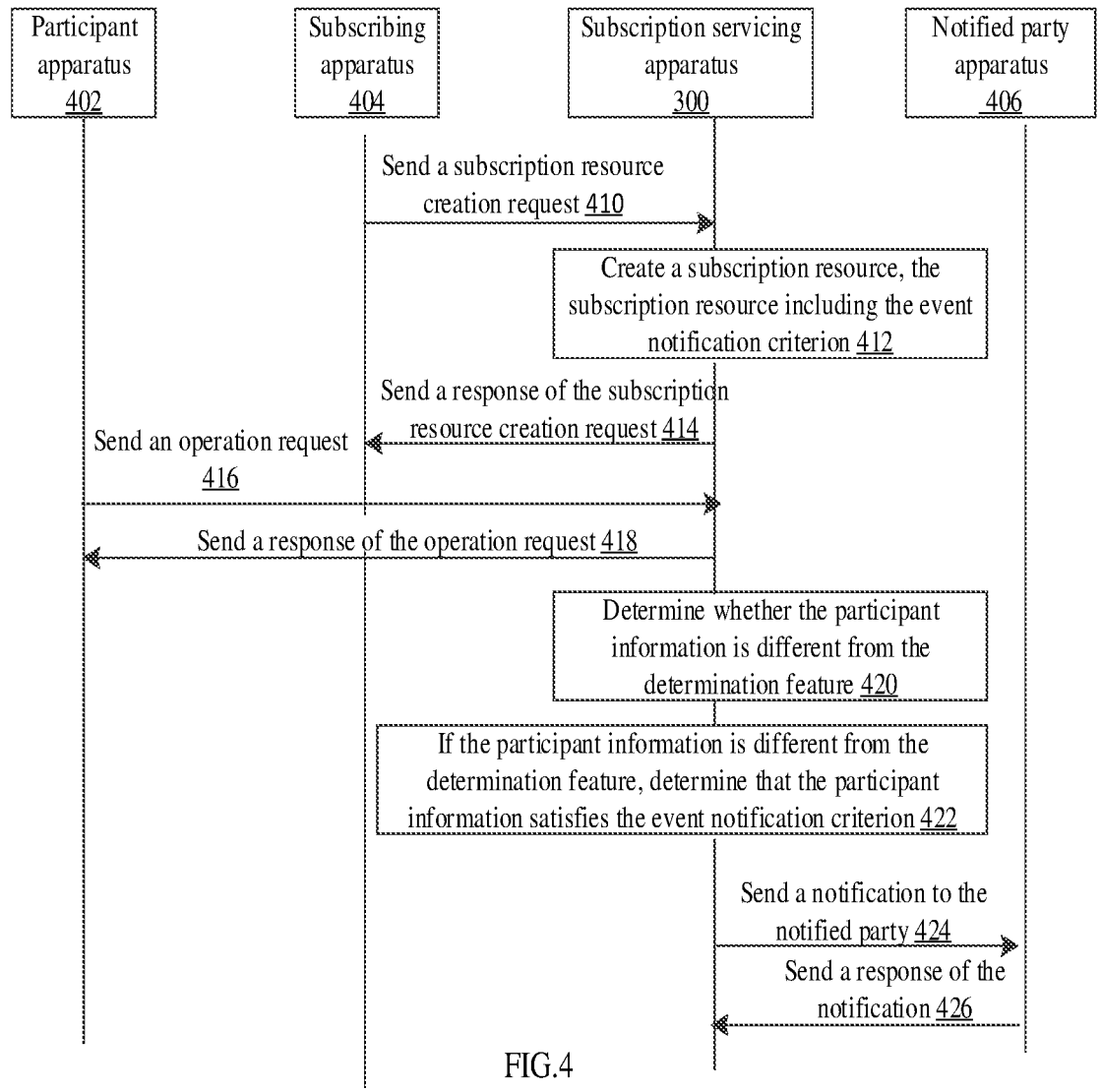
FIG. 4 is a schematic diagram of a process of subscribing notifications provided by at least one embodiment of the present disclosure.

FIG. 4 is a schematic diagram of a process of subscribing notifications provided by an embodiment of the present disclosure.

Firstly, the subscribing apparatus 404 sends a subscription resource creation request to the subscription servicing apparatus 300 (step 410), for example, sends a request to create <subscription>. The subscription resource creation request may include subscriber information (for example, a subscriber identifier, a subscriber role, etc.). In response to the subscription creation request, the subscription servicing apparatus 300 creates a subscription resource; specifically, <subscription> is created under the subscription resource, including eventNotificationCriteria, with the eventNotificationCriteria including a parameter fixedID. For example, the subscription resource includes event notification criteria (eventNotificationCriteria) (step 412).

The subscription servicing apparatus 300 sends a response of the subscription creation request to the subscribing apparatus 404 (step 414).

The participant apparatus 402 sends an operation request, for example, a request for an operation such as create, retrieve, update or delete, to the subscription servicing apparatus 300 (step 416). The operation request may include participant information (for example, a participant identifier or a participant role, etc.).

The subscription servicing apparatus 300 sends a response of the operation request to the participant apparatus 402 (step 418).

The subscription servicing apparatus 300 determines whether the participant information satisfies the event notification criterion. For example, the subscription servicing apparatus 300 determines whether the participant information is different from the determination feature (step 420). If the participant information is different from the determination feature, the subscription servicing apparatus 300 determines that the participant information satisfies the event notification criterion (step 422). The subscription servicing apparatus 300 sends a notification to the notified-party apparatus 406 (step 424). The notified-party apparatus 406 sends a response of the notification to the subscription servicing apparatus 300 (step 426).

For example, after receiving the operation request, the subscription server detects an ID of the operation-request sending party, including, for example, an AE-ID, a CSE-ID or a resourceID, and the like, and compares the ID of the operation-request sending party with a subscription-resource preset fixedID. If the ID of the operation-request sending party and the subscription-resource preset fixedID are the same, the subscription server sends a notification to the notified party, and receives a response with respect to the notification from the notified party.

Figure 5:
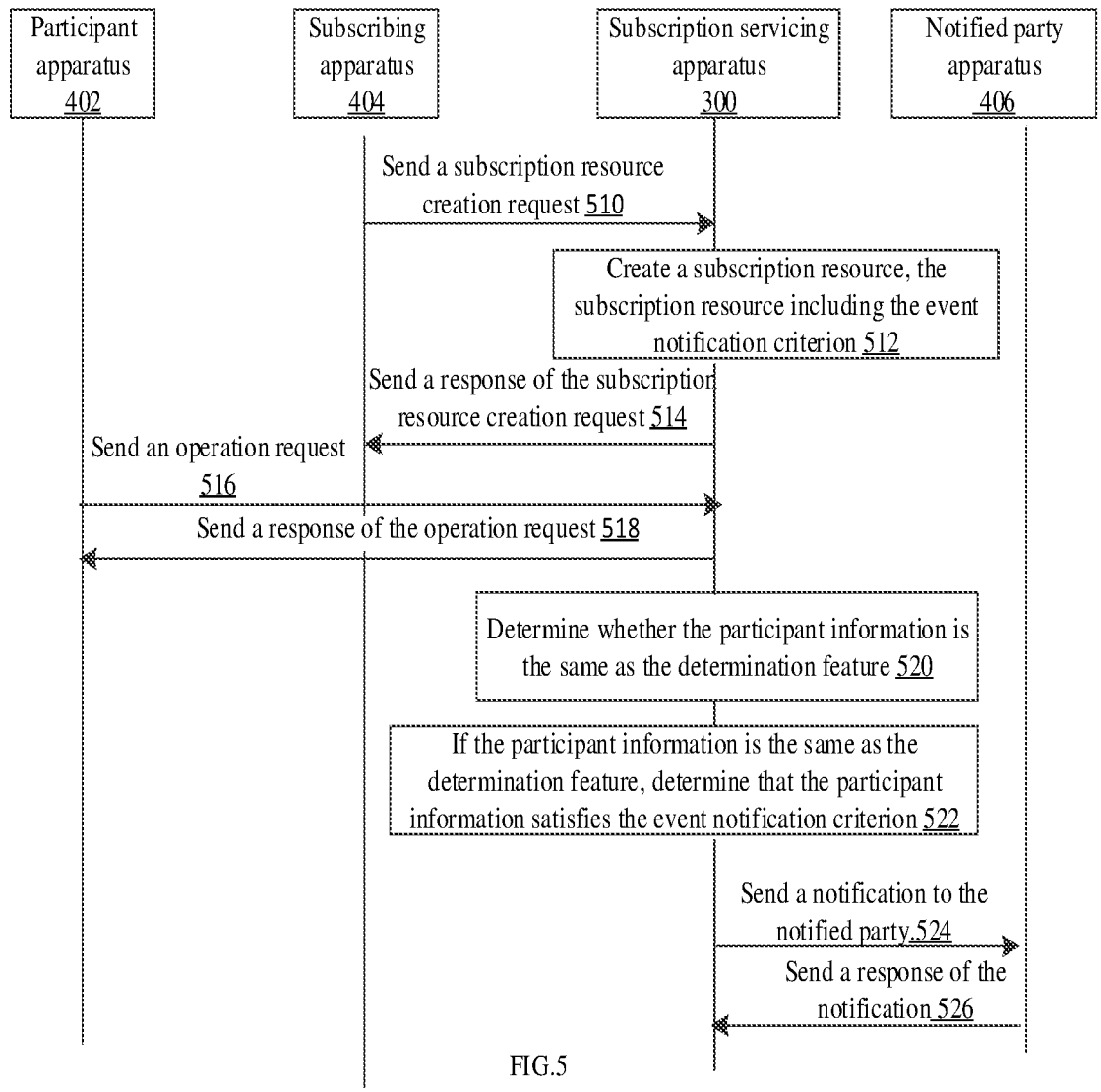
FIG. 5 is a schematic diagram of another process of subscribing notifications provided by at least one embodiment of the present disclosure.

FIG. 5 is a schematic diagram of another process of subscribing notifications provided by an embodiment of the present disclosure.

Firstly, the subscribing apparatus 404 sends a subscription creation request to the subscription servicing apparatus 300 (step 510), that is, the subscriber sends the request to create <subscription> to the subscribed party. In response to the subscription creation request, the subscription servicing apparatus 300 creates the subscription resource, specifically, a sub-resource <subscription> is created under the subscription resource and includes a role number parameter (roleNr), and a parameter eventNotificationCriteria includes a comparison parameter (that is, sub-parameters such as roleNrBigger, roleNrSmaller).

For example, the subscription resource includes event notification criteria (eventNotificationCriteria) (step 512). The subscription servicing apparatus 300 sends a response of the subscription creation request to the subscribing apparatus 404 (step 514), that is, the subscribed party sends a response responsive to creation of <subscription> to the subscriber. The participant apparatus 402 sends an operation request to the subscription servicing apparatus 300 (step 516), for example, the participant sends any one request of create/retrieve/update/delete to the subscribed party. The subscription servicing apparatus 300 sends a response of the operation request to the participant apparatus 402 (step 518), for example, the subscribed party sends a response of any one request of create/retrieve/update/delete to the participant.

The subscription servicing apparatus 300 determines whether the participant information satisfies the event notification criterion. For example, the subscription servicing apparatus 300 determines whether the participant information is the same as the determination feature (step 520). If the participant information is the same as the determination feature, the subscription servicing apparatus 300 determines that the participant information satisfies the event notification criterion (step 522). The subscription servicing apparatus 300 sends a notification to the notified-party apparatus 406 (step 524). The notified-party apparatus 406 sends a response of the notification to the subscription servicing apparatus 300 (step 526).

For example, after the subscribed party accepts the request and detects that a roleID is different from a roleID that has been maintained, the number of roles is increased by 1 (that is, <subscription>/roleNr is incremented by 1); then, it is determined whether the number of roles is greater than a first comparison parameter (that is, it is determined whether the roleNr is greater than the roleNrBigger), or it is determined whether the number of roles is less than a second comparison parameter (that is, it is determined whether the roleNr is less than the roleNrSmaller); if yes, then the subscribed party sends a Notify request to the notified party; and the notified party sends a Notify response to the subscribed party.

Figure 6:
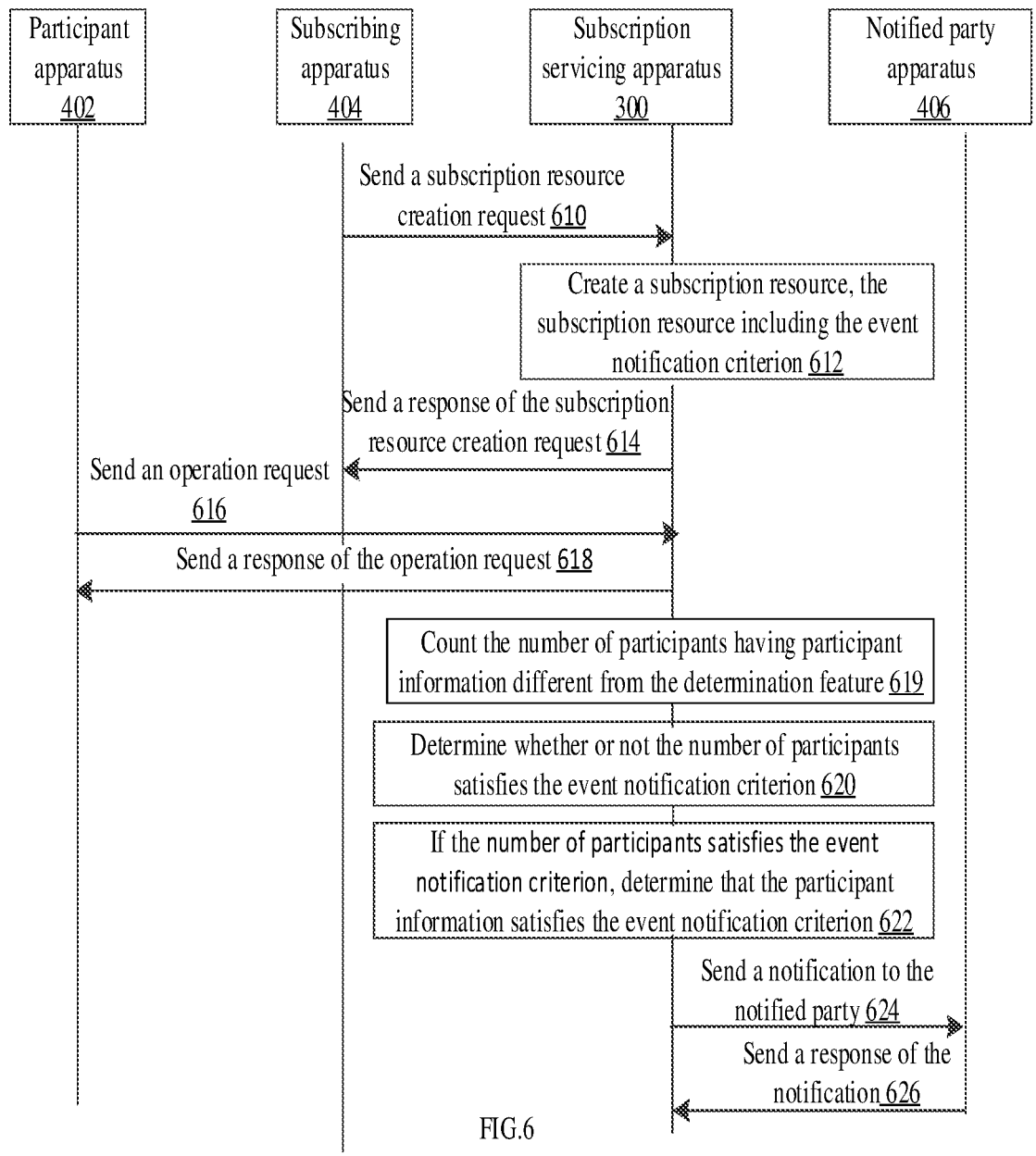
FIG. 6 is a schematic diagram of yet another process of subscribing notifications provided by at least one embodiment of the present disclosure.

FIG. 6 is a schematic diagram of another process of subscribing notifications provided by an embodiment of the present disclosure. Firstly, the subscribing apparatus 404 sends a subscription resource creation request to the subscription servicing apparatus 300 (step 610). In response to the subscription resource creation request, the subscription servicing apparatus 300 creates the subscription resource, where the subscription resource includes event notification criteria (step 612). The subscription servicing apparatus 300 sends a response of the subscription resource creation request to the subscribing apparatus 404 (step 614).

The participant apparatus 402 sends an operation request to the subscription servicing apparatus 300 (step 616). The operation request may include participant information (for example, a participant identifier or a participant role, etc.). The subscription servicing apparatus 300 sends a response of the operation request to the participant apparatus 402 (step 618).

The subscription servicing apparatus 300 determines whether the participant information satisfies the event notification criterion. For example, the subscription servicing apparatus 300 counts the number of participants whose participant information is different from the determination feature (step 619). For example, among all the participants who access the subscription servicing apparatus 300, the subscription servicing apparatus 300 records the number of participants whose participant information is different from the determination feature, and the number of other participants whose participant information is the same as the determination feature is not counted. The subscription servicing apparatus 300 determines whether the number of participants satisfies the event notification criterion (step 620). If the number of participants satisfies the event notification criterion, the subscription servicing apparatus 300 determines that the participant information satisfies the event notification criterion (step 622). The subscription servicing apparatus 300 sends a notification to the notified-party apparatus 406 (step 624). The notified-party apparatus 406 sends a response of the notification to the subscription servicing apparatus 300 (step 626).

An example of the notification subscription is as follows. For example, a subscriber subscribes energy notification service from the subscription servicing apparatus 300 (for example, an energy management platform) through the subscribing device 101 (or the subscribing apparatus 404), for managing energy consumption (for example, electrical energy) at home. All household appliances in the subscriber's home may be participant devices 104, which may all register to the energy management platform in the subscription servicing device 150; one of the purposes of registration is to allow a user terminal to control and manage the household appliances through the energy management platform. After the registration is completed, the subscriber may subscribe the energy notification service from the subscription servicing apparatus 300 (for example, the energy management platform) through the subscribing device 101. The subscribed notification service is: if more than 10 household appliances consume power at one night, then an energy-consumption notification is sent to another family member (the notified party, different from the subscriber). Each household appliance may send an update request to the energy management platform after consuming electrical energy, and request to modify a value of a corresponding resource on the energy management platform; and so, when more than 10 household appliances have modified their resource values on the energy management platform in one night, the energy management platform may send a notification to another family member (the notified party).

Figure 7:
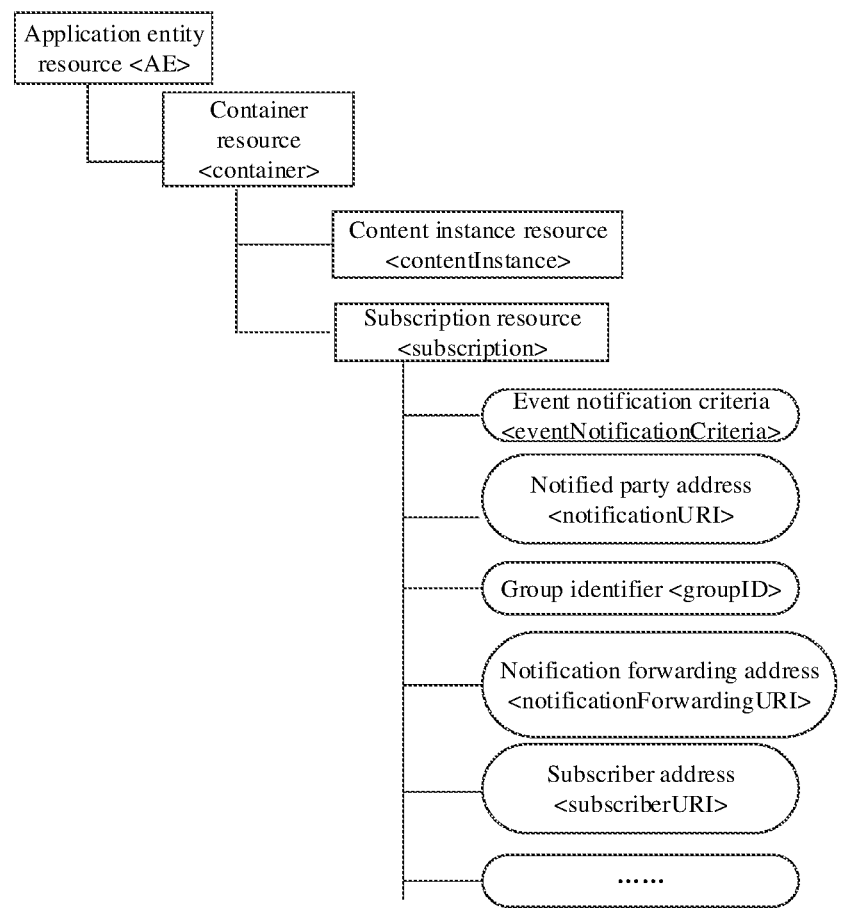
FIG. 7 is a structural schematic diagram of an exemplary subscription resource provided by at least one embodiment of the present disclosure.

FIG. 7 is a schematic diagram of a structure of an exemplary subscription resource provided by an embodiment of the present disclosure. After the participant is registered by the subscribed party, an application entity resource (an <AE> resource as shown in FIG. 7) is generated, and the application entity resource includes a container resource (a <container> resource). The container resource includes a content instance resource (for example, <contentInstance> shown in FIG. 7), and the content instance resource may be used for storing information content.

When the subscriber sends a subscription request to the subscribed party (for example, the request indicates information of subscription to the application entity resource <AE>). The subscribed party creates a subscription resource (i.e., the <subscription> resource in FIG. 7) under the application entity resource/container resource. The subscription resource includes event notification criteria (eventNotificationCriteria), a notified-party uniform resource identifier (notificationURI), a group identifier (groupID), a notification forwarding uniform resource identifier (notificationForwardingURI), a subscriber uniform resource identifier (subscriberURI), and the like. The subscription resource may also include other content items not shown in FIG. 7, which will not be limited here in the present disclosure.

The method, the apparatus and the system for notification provided by the embodiments of the present disclosure, can implement subscribing notifications based on specific participants. After the subscription servicing party detects a specific participant, it sends a notification message to the notified party. Notification service based on the participant is implemented, and differentiation requirements of users are satisfied.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at least one. The terms "comprises," "comprising," "includes," "including," etc., are intended to specify that the elements or the objects stated before these terms encompass the elements or the objects and equivalents thereof listed after these terms, but do not preclude the other elements or objects.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201610617868.5 filed on Jul. 29, 2016 and the Chinese Patent Application No. 201610665731.7 filed on Aug. 12, 2016, which are incorporated herein by reference in its entirety as part of the disclosure of the present application.

The invention claimed is:

1. A method for sending a notification, by a subscription servicing apparatus in an Internet of Things (IoT) environment further including participants, a subscriber, and a notified party, comprising:
   determining an event notification criterion, wherein the event notification criterion is included in a subscription resource created according to a subscription resource creation request sent by the subscriber; and
   determining whether participant information of the participants satisfies the event notification criterion, and if yes, sending the notification to the notified party;
   wherein the participant information includes a participant role, a participant identifier, a participant identifier feature, and a participant role feature, the participant identifier feature is a structural feature of the participant identifier and/or a content feature of the participant identifier, and the participant role feature is a feature owned by the participant role; and
   wherein the participants are different from the subscriber, the subscription servicing apparatus, and the notified party, and the subscriber, the subscription servicing apparatus, and the notified party are all different entities;
   determining whether participant information of the participants satisfies the event notification criterion includes:
      counting a number of participants having that have participant information different from a determination feature;
      determining whether the number of participants satisfies the event notification criterion; and
      if the number of participants satisfies the event notification criterion, determining that the participant information satisfies the event notification criterion.

2. The method according to claim 1, further comprising:
   receiving the subscription resource creation request sent by the subscriber; and
   creating the subscription resource, the subscription resource including the event notification criterion.

3. The method according to claim 1, further comprising:
receiving a subscription request sent by the subscriber to determine the event notification criterion.

4. The method according to claim 1, further comprising:
receiving an operation request, wherein the operation request includes the participant information; or receiving a registration request, wherein the registration request includes the participant information.

5. The method according to claim 1, wherein determining whether the number of participants satisfies the event notification criterion includes:
determining whether the number of participants is greater than or equal to a first threshold, and if yes, determining that the number of participants satisfies the event notification criterion; or,
determining whether the number of participants is less than or equal to a second threshold, and if yes, determining that the number of participants satisfies the event notification criterion; or,
determining whether the number of participants is greater than or equal to the first threshold and less than or equal to the second threshold, and if yes, determining that the number of participants satisfies the event notification criterion.

6. A subscription servicing apparatus for sending a notification, in an Internet of Things (IoT) environment further including participants, a subscriber, and a notified party, and comprising:
a determining unit, configured to determine an event notification criterion, wherein the event notification criterion is included in a subscription resource created according to a subscription resource creation request sent by the subscriber;
a notifying unit, configured to determine whether participant information of the participants satisfies the event notification criterion, and if yes, send the notification to the notified party;
wherein the participant information includes a participant role, a participant identifier, a participant identifier feature, and a participant role feature, the participant identifier feature is a structural feature of the participant identifier and/or a content feature of the participant identifier, and the participant role feature is a feature owned by the participant role; and
wherein the participants are different from the subscriber, the subscription servicing apparatus, and the notified party, and the subscriber, the subscription servicing apparatus, and the notified party are all different entities,
wherein when determining whether the participant information of the participants satisfies the event notification criterion, the notifying unit is configured to:
count a number of participants that have participant information different from a determination feature, or, count a number of participants that have the participant information identical to the determination feature;
determine whether the number of participants satisfies the event notification criterion; and
if the number of participants satisfies the event notification criterion, determine that the participant information satisfies the event notification criterion, and send a notification to the notified party.

7. The apparatus according to claim 6, further comprising:
a first receiving unit, configured to receive the subscription resource creation request sent by the subscriber, and
a subscription resource creating unit, configured to create the subscription resource, wherein the subscription resource includes the event notification criterion.

8. The apparatus according to claim 6, further comprising:
a second receiving unit, configured to receive a subscription request sent by the subscriber to determine the event notification criterion.

9. The apparatus according to claim 6, wherein the first receiving unit is further configured to receive an operation request, wherein the operation request including the participant information; or the first receiving unit is further configured to receive a registration request, wherein the registration request includes the participant information.

10. A system for notification, comprising:
the subscription servicing apparatus according to claim 6;
a subscribing apparatus, configured to send a subscription creation request to the subscription servicing apparatus;
a participant apparatus, configured to send an operation request to the subscription servicing apparatus; and
a notified-party apparatus, configured to receive a notification from the subscription servicing apparatus.

11. A method for sending a notification, by a subscription servicing apparatus in an Internet of Things (IoT) environment further including participants, a subscriber, and a notified party, comprising:
determining an event notification criterion, wherein the event notification criterion is included in a subscription resource created according to a subscription resource creation request sent by the subscriber; and
determining whether participant information of the participants satisfies the event notification criterion, and if yes, sending the notification to the notified party;
wherein the participant information includes a participant role, a participant identifier, a participant identifier feature, or a participant role feature, the participant identifier feature is a structural feature of the participant identifier and/or a content feature of the participant identifier, and the participant role feature is a feature owned by the participant role; and
wherein the participants are different from the subscriber, the subscription servicing apparatus, and the notified party, and the subscriber, the subscription servicing apparatus, and the notified party are all different entities;
determining whether participant information of the participants satisfies the event notification criterion includes:
counting a number of participants that have participant information identical to a determination feature;
determining whether the number of participants satisfies the event notification criterion; and
if the number of participants satisfies the event notification criterion, determining that the participant information satisfies the event notification criterion.

12. The method according to claim 11, wherein determining whether the number of participants satisfies the event notification criterion includes:
determining whether the number of participants is greater than or equal to a first threshold, and if yes, determining that the number of participants satisfies the event notification criterion; or,
determining whether the number of participants is less than or equal to a second threshold, and if yes, determining that the number of participants satisfies the event notification criterion; or, determining whether the number of participants is greater than or equal to the first threshold and less than or equal to the second threshold, and if yes, determining that the number of participants satisfies the event notification criterion.

* * * * *